Patented Dec. 10, 1946

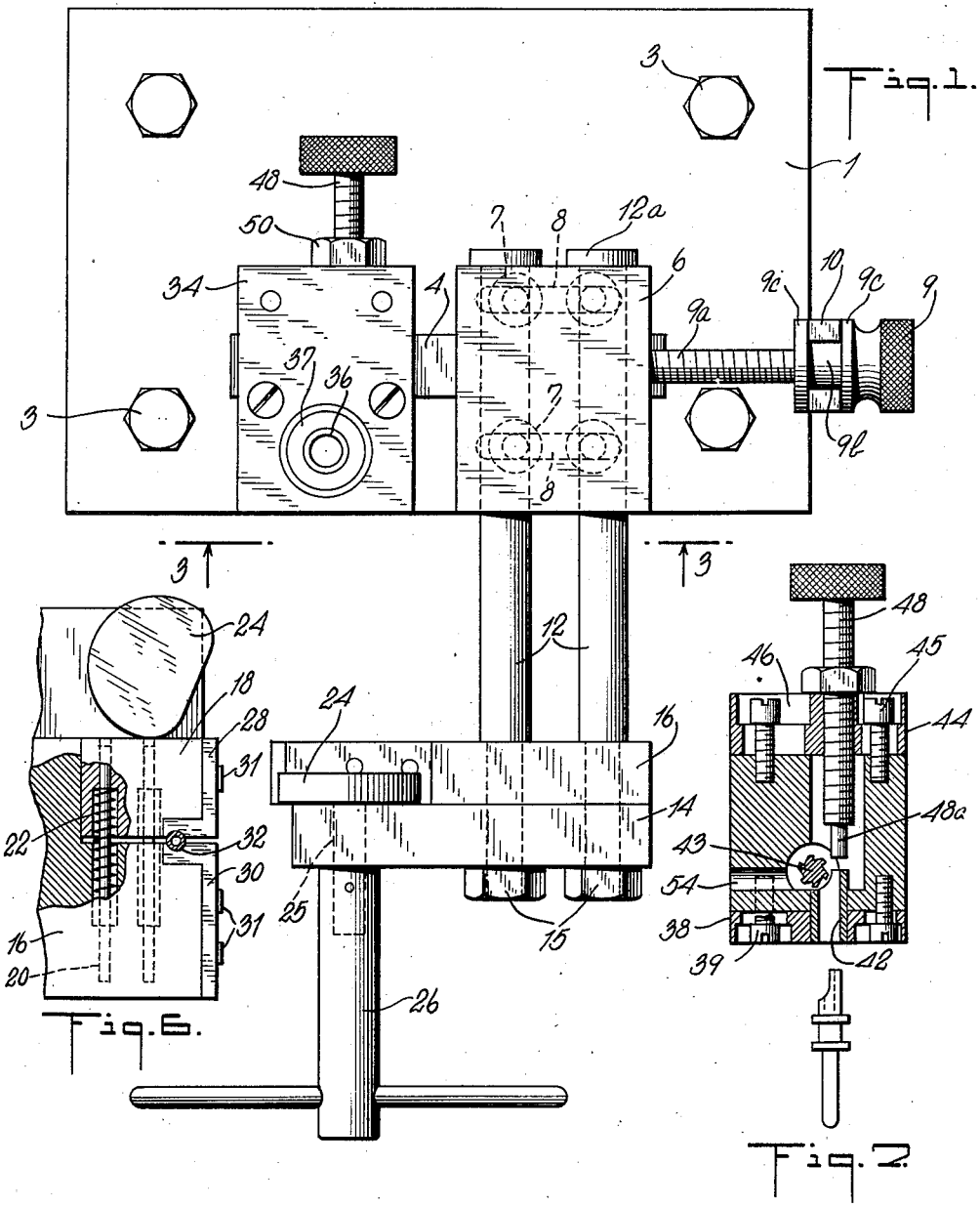

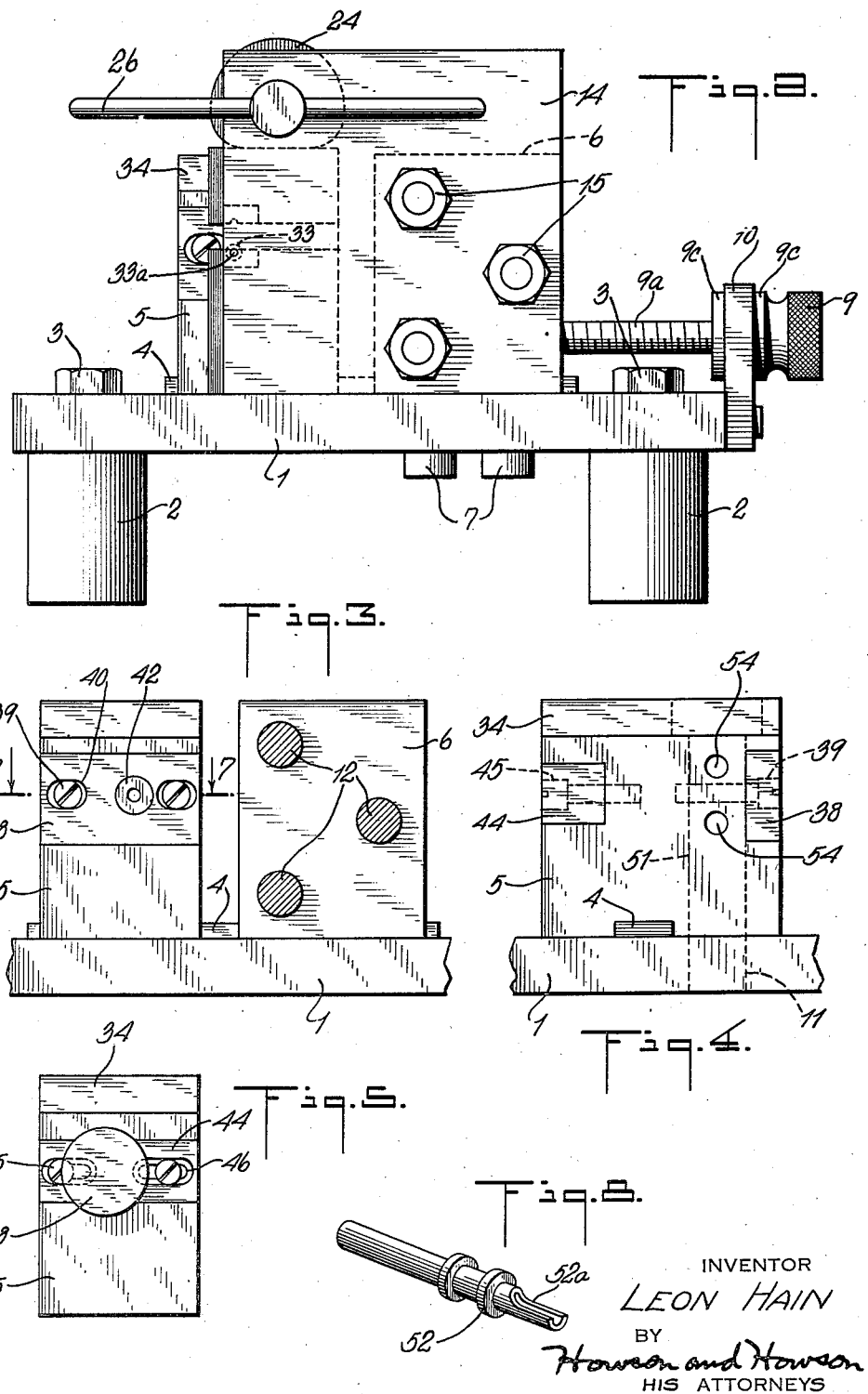

2,412,454

UNITED STATES PATENT OFFICE 2,412,454

MILLING FIXTURE

Leon Hain, Brooklyn, N. Y.

Application August 16, 1944, Serial No. 549,763

3 Claims. (Cl. 90—11)

This invention relates to fixtures for holding a work piece for a machining operation and it is an object of this invention to provide an improved fixture of the class described which can be readily altered so as to perform the machining operation on work pieces of different dimensions; which is of simple construction and which will accomplish the rapid and uniform machining of a large number of the work pieces without necessitating a skilled operator.

In the drawings, in which a preferred embodiment of the invention is shown:

Fig. 1 is a top plan view of a fixture in accordance with this invention;

Fig. 2 is a view in front elevation of the fixture shown in Fig. 1;

Fig. 3 is a partial vertical sectional view taken as on the line 3—3 of Fig. 1;

Fig. 4 is a partial view in side elevation looking from the left in Fig. 1;

Fig. 5 is a partial view in elevation looking as from the top of the sheet in Fig. 1;

Fig. 6 is a fragmentary view in elevation showing the means for holding the work, parts being broken away to show other parts more clearly;

Fig. 7 is a horizontal sectional view taken as on line 7—7 of Fig. 3; and

Fig. 8 is a perspective view of a finished piece of work.

A fixture in accordance with this invention comprises, as shown in the drawings, a suitable base plate 1 mounted on short supports 2 secured to the base plate 1 by bolts 3. Secured to the upper face of the base plate 1 is a guide strip 4 and blocks 5 and 6 recessed to fit over the guide strip. The block 5 is secured in fixed position by suitable bolts passing through base plate and engaging in the block while the block 6 is adjustably secured to the base plate 1 by bolts 7 passing through slots 8 in the base plate 1 and engaging in the block 6. Adjustment of the block 6 is secured by an adjusting screw 9 having a threaded portion 9a engaging in the block 6 and a portion 9b fitting in a slot in a member 10 secured to an end of the base plate 1. Collars 9c on screw 9 engage opposite faces of the slotted member 10 and prevent longitudinal movement of the adjusting screw 9.

Slidably mounted in the block 6 are rods 12 having, at one end, enlarged heads 12a and, at the other end, portions of reduced diameter engaged in openings in a plate 14 which is secured on the rods 12 by nuts 15. Mounted on the rods 12 and secured to the plate 14 is a plate 16 which is cut away, at one corner to receive a smaller plate 18 movably mounted on guide pins 20 inserted in openings in the plates 16 and 18. The openings receiving the pins 20 are enlarged for a portion of their length in each plate to receive springs 22 which surround the pins 20 and serve to force the plates 16 and 18 apart. A cam 24 having an operating shaft 25 rotatably mounted in the plate 14 and operated by a handle 26 attached to the outer end of the shaft 25 serves to operate the plate 18 to the plate 16 against the action of the springs 22. In order that the plates 18 and 16 can serve as a vise suitable to properly hold work pieces of different dimensions the plates 18 and 16 are cut away to receive L-shape vise-jaws 28 and 30, respectively, which are secured to the respective plates by suitable screws 31. The jaws 28 and 30 have their engaging faces channeled, as at 32, to a diameter suitable for the work piece to be held and their faces, adjacent the plates 18 and 16 are recessed to receive a stop disk 33 having a stem 33a which is engaged in an opening in the plate 14. The thickness of the stop disk 33 will be such that the proper length of the work piece will project from the vise jaws when the work piece engages the stop disk.

To operate upon the work piece, the block 5 has secured to its top surface a plate 34 having an opening in which is mounted a tool guide bushing 36 journaled in a suitable ball bearing 37, the bushing 36 being alined with openings in the block 5 and base plate 1. To guide and support the work piece in the proper position to be operated upon by the tool in the bushing 36, the end of the block 5 adjacent the vise is grooved to receive a plate 38 adjustably secured to the block 5 by screws 39 engaging in slots 40 in the plate 38. Mounted in the plate 38 and projecting into the opening below the bushing 36 is a bushing 42 which is partially cut away, as shown in Fig. 7, to permit of the work piece in the bushing 42 being engaged by a tool 43 in the bushing 36 while supporting the work piece so as to prevent the work piece bending away from the tool. To limit the insertion of the work piece the opposite end of the block 5 is grooved to receive a plate 44 adjustably secured to the block 5 by screws 45 engaging in slots 46 in the plate 44. Mounted in a threaded opening in the plate 44 is a stop 48 having a portion 48a of reduced diameter so positioned as to engage the end of the work piece in the bushing 42. A lock nut 50 secures the stop 48 in adjusted position.

The fixture is designed for milling the ends of electrical contacts as the contact 52 of Fig. 8 to cut away portion of an end of the contact, as at 52a, so as to permit of a connection being readily inserted in the cut-away end of the contact and soldered in position. To carry out the operation, a reaming tool 43 is rotated in the bushing 36, the contact to be milled is held between the jaws 28 and 30 of the vise with its end abutting the stop disk 33 and the vise is moved forward until the opposite end of the contact engages the reduced end 48a of the stop 48. The bushing 42 holds the contact against the tool and the stop disk 33 and adjustable stop 48 insure the milling of the contact 52 being carried only to the desired extent. The cuttings pass down through the openings 51 and 11 in the block 5 and base plate 1, respectively, or through a side opening 54 in the block 5.

The fixture can be adjusted to take work pieces of different dimensions by substituting a plate 38 having a different bushing 42 and by substituting vise jaws 28 and 30 channeled to receive a work piece of different diameter and recessed to receive a disk stop 33 of different thickness. Also a different plate 34 having a bushing 36 to guide a reaming tool of a different size can be substituted. The adjustment of the block 6 by the screw 9 and the adjustment of the plate 38 permit of properly positioning the work piece with respect to the tool while the adjustment of the plate 44 and the stop 48 permits of positioning the stop 48 to insure engagement of the stop 48 with the work piece and the limiting of the insertion of the work piece in the bushing 42 to the desired extent.

What is claimed is:

1. In a milling fixture, a supporting block, a plate carried by said block, a tool guide rotatably mounted in said plate and directed inwardly of said block, a second plate secured to said block, a guide bushing mounted in said second plate and projecting into said block for supporting a work piece engaged by a tool in said tool guide, a third plate secured to said block and adjustable stop means mounted in said third plate for limiting movement into said block of a work piece in said guide bushing.

2. In a milling fixture a base plate, a supporting block fixed on said base plate, a tool guide mounted for rotation in said block, a guide bushing in said block to prevent movement of the work from the tool, a second block slidably mounted on said base plate, means for shifting said second block on said base plate, a work vise and means supporting said work vise from said second block for movement relatively to said second block to and from said guide bushing.

3. In a milling fixture, a base plate, a supporting block fixed on said base plate, a tool guide mounted for rotation in said block, a guide bushing in said block, said guide bushing being cut away to provide a work supporting portion to prevent movement of the work from the tool, a second block slidably mounted on said base plate, guide means for said second block on said base plate, means for shifting said second block on said base plate, a work vise, means supporting said work vise from said second block for movement relatively to said second block to and from said guide bushing and stop means for positioning the work in said guide bushing.

LEON HAIN.